United States Patent [19]
Li et al.

[11] Patent Number: 4,711,227
[45] Date of Patent: Dec. 8, 1987

[54] APPARATUS AND METHOD FOR ELECTRONIC IGNITION CONTROL

[75] Inventors: Edward Li, Roselle; Leonard Foss, Lombard; David Cousins, Carol Stream, all of Ill.

[73] Assignee: Motorola, Inc., Schaumburg, Ill.

[21] Appl. No.: 896,981

[22] Filed: Aug. 15, 1986

[51] Int. Cl.$^4$ ...................... F02P 5/145; F02P 11/00
[52] U.S. Cl. .................................. 123/643; 123/630
[58] Field of Search ............... 123/414, 416, 417, 418, 123/620, 630, 636, 637, 643

[56] References Cited

U.S. PATENT DOCUMENTS

| | | | |
|---|---|---|---|
| 4,241,708 | 12/1980 | Javeri | 123/418 |
| 4,265,211 | 5/1981 | Meloeny | 123/643 |
| 4,338,813 | 7/1982 | Hunninghaus et al. | 73/116 |
| 4,338,903 | 7/1982 | Bolinger | 123/476 |
| 4,378,004 | 3/1983 | Petrie | 123/643 |
| 4,380,980 | 4/1983 | Javeri | 123/643 X |
| 4,385,605 | 5/1983 | Petrie et al. | 123/414 |
| 4,442,822 | 4/1984 | Kondo et al. | 123/643 |
| 4,457,286 | 7/1984 | Katayama et al. | 123/643 X |
| 4,483,293 | 11/1984 | Akasu | 123/643 X |
| 4,485,784 | 12/1984 | Fujii et al. | 123/416 |
| 4,494,518 | 1/1985 | Katayama et al. | 123/612 |
| 4,556,040 | 12/1985 | Heyke | 123/643 |
| 4,572,151 | 2/1986 | Toyama | 123/622 |

*Primary Examiner*—Willis R. Wolfe, Jr.
*Attorney, Agent, or Firm*—Robert J. Crawford

[57] ABSTRACT

Disclosed is an ignition signal control apparatus and method for a distributorless ignition system of the type having a sensing circuit which generates at least one reference signal which may be used to periodically indicate when ignition spark plugs should be fired, and at least one identifier signal determinative of the engine's crank angle position to identify the spark plug firing sequence. One aspect of the invention includes detecting that a transition in the identifier signal has not occurred, and generating a replacement signal independent of the crank angle position, to select one or more of the spark plugs to fire.

31 Claims, 3 Drawing Figures

APPARATUS AND METHOD FOR ELECTRONIC IGNITION CONTROL

FIELD OF THE INVENTION

The present invention relates generally to electronic engine ignition control and, more particularly, to signal control for spark plug firing in a distributorless ignition system.

DESCRIPTION OF THE PRIOR ART

Distributorless engine ignition systems have been known and successfully used in recent years. The absence of a distributor in an ignition system requires the presence of two or more signals for ignition maintenance. Typically, these signals have two primary functions; to inform the engine when to fire the spark plugs, and to inform the engine which spark plugs to fire. The former function is often implemented using a signal which is referred to as "spark plug output" (SPOUT), while the latter function may be implemented using a signal sometimes referred to as "cylinder identification" (CID). These signals are depicted in a timing diagram in FIG. 2. Since the rotation and position of the crankshaft indicates engine timing with respect to both SPOUT and CID, timing for these signals may be readily extracted from sensor circuitry located about the crankshaft. The signals themselves are usually generated by the sensor circuitry using common digital circuitry. Such a sensing system is described in U.S. Pat. No. 4,338,813, assigned to the assignee of the present invention.

A problem exists, however, if one or both of these signals are lost. The signals may be lost for a number of reasons, including sensor circuitry failures, signal generation circuitry failures, broken wire, etc. Loss of the SPOUT signal usually results in complete ignition failure. This follows since, in the absence of SPOUT, no timing is present to indicate when to fire the spark plugs.

Further, until now, loss of the CID signal has also resulted in complete ignition failure. If the CID signal is lost before the engine is started, known distributorless circuits disable start-up. Similarly, if the CID signal is lost after the engine is running, although the engine will usually continue to run, known distributorless circuits provide no means for future engine start-ups. Hence, when such a failure occurs, before the engine can be started again, the car must either be repaired where it lies, or it must be towed to a repair location.

Accordingly, since the CID signal is required to start the engine and it is susceptible to failures, the need to provide ignition start-up notwithstanding such failures is well recognized.

OBJECTS AND SUMMARY OF THE PRESENT INVENTION

It is an object of the present invention to provide an improved apparatus and method for a distributorless ignition system which overcomes the above described shortcomings.

It is a further object of the present invention to provide an apparatus and method for a distributorless ignition system which allows ignition start-up when the cylinder identification signal has failed.

In brief, the present invention pertains to ignition signal control circuitry for a distributorless ignition system wherein a sensing circuit generates at least one reference signal which may be used to periodically indicate when spark plugs should be fired and at least one identifier signal which may be used to identify the spark plug firing sequence. One aspect of the present invention is a method for selecting particular spark plugs to fire when the identifier signal has failed, comprising steps that include detecting whether or not a transition in the identifier signal has occurred, and generating a replacement signal, independant of the crank angle position, to select one or more of the spark plugs to fire.

According to the preferred embodiment, the reference signal is sensed to determine a window during which a transition in the identifier signal should occur, and the identifier signal is detected to determine if a transition has occurred during the window. If the identifier signal has not occurred during the window, a third signal is generated, in substitution for the identifier signal, to select one or more of the spark plugs to fire.

DETAILED DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawing, in which like reference numerals identify like elements, and wherein:

DETAILED DESCRIPTION OF THE PREFERRED EMBODIMENT

Figure 1:
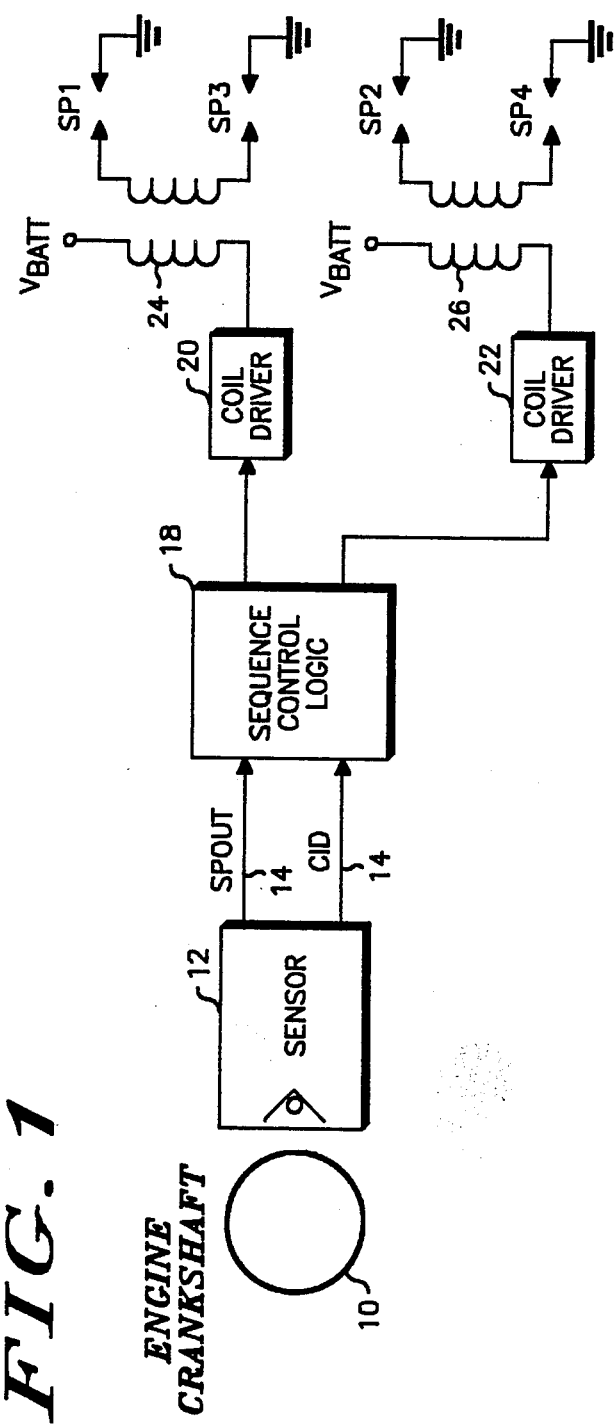
FIG. 1 is a schematic representation, in the form of a block diagram and in accordance with the present invention, of an ignition system which includes an apparatus for controlling signals which pertain to the firing sequence of spark plugs.

Referring to FIG. 1, shown is a block diagram of an arrangement in which the present invention may be used. FIG. 1 includes an engine crankshaft 10 which is used to extract the timing necessary to generate SPOUT and CID signals. A sensor 12, such as described in U.S. Pat. No. 4,338,813, supra, may be used to sense the crankshaft position and to extract this timing for control of the spark plug firing sequence. Sensor 12 has a set of output signals 14 which control when the spark plugs should be fired and which spark plugs to fire. As discussed in the description of the prior art, these signals are referred to as SPOUT and CID. Sequence control logic, block 18, uses these signals to control the firing of the spark plugs.

The outputs of sequence control logic 18 are connected to coil drivers 20 and 22. Coil drivers 20 and 22 actuate coils 24 and 26, each of which directly activates the firing of one pair of spark plugs. Although the embodiment shown is for a 4-cylinder engine, one skilled in the art will recognize that this circuit may be modified to accommodate any number of cylinders.

The present invention is focused around sequence control logic 18. Given input signals which indicate when (SPOUT) and which (CID) spark plugs to fire, sequence control logic 18 controls the coil driver inputs and monitors the input signals for a failure to produce the correct coil (spark plug) identification. If sequence control logic 18 detects that the CID input signal has failed to identify which spark plugs to select at start-up, sequence control logic 18 automatically selects particular ones of the spark plugs, independent of the CID input signal.

Figure 2:
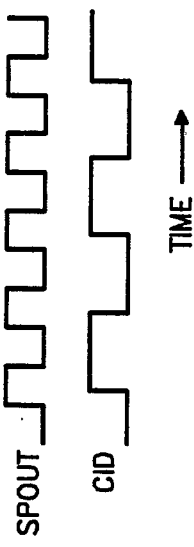
FIG. 2 is a set of timing signals illustrating two input signals which may be used in the present invention.

In FIG. 2, SPOUT and CID are illustrated in a timing diagram. SPOUT is marked at each low-to-high transition to indicate when a pair of spark plugs should be fired. CID alternates between low and high for each low-to-high transition of SPOUT to indicate which of the four spark plugs to fire. For example, after a transition of CID from high to low, spark plugs 1 and 3 should be fired, and after a transition of CID from low to high, spark plugs 2 and 4 should be fired.

Figure 3:
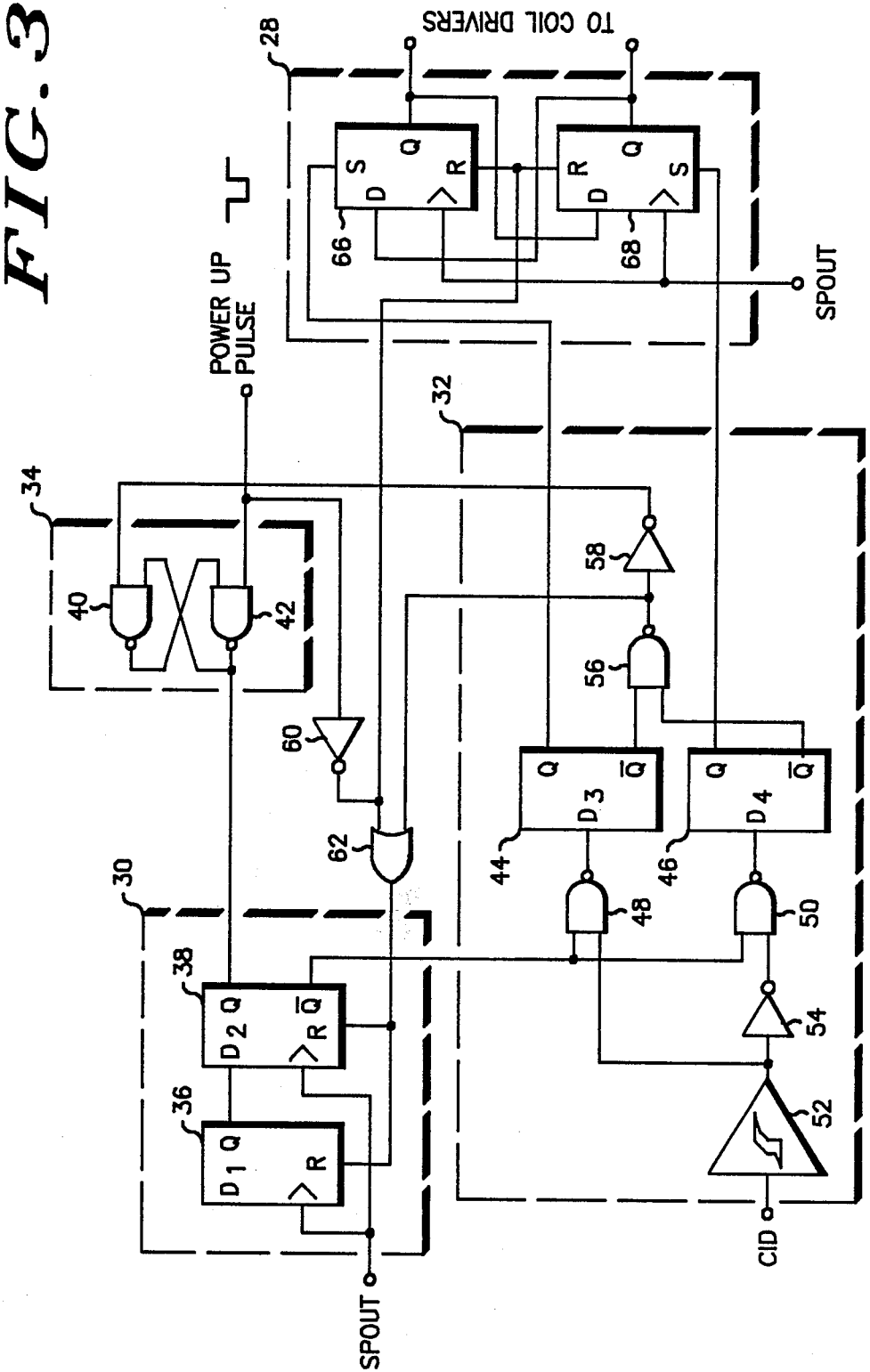
FIG. 3 is a detailed schematic representation of block 18 in FIG. 1.

In FIG. 3, sequence control logic 18 is shown in detail. FIG. 3 is primarily composed of four blocks, blocks 28, 30, 32 and 34. These blocks include two inputs, SPOUT and CID, which are used to control the outputs which actuate coil drivers 20 and 22. Block 34 is used to enable and disable the circuit in block 30 after engine start-up. Once block 30 is enabled, it senses transitions in SPOUT to determine a time window during which a transition in CID should occur. The circuitry in block 32 is used to detect the transition in CID during the window. Block 28 includes a ring counter which is prompted by block 32 to directly control the outputs which actuate the coil drivers.

Flip-flops 66 and 68 in block 28 are used to sequentially fire the spark plugs according to timing which is specified by SPOUT. Upon power-up, using inverter 60, both flip-flops 66 and 68 are reset (their Q outputs are set to zero). Flip-flops 66 and 68 actuate coil drivers 20 and 22, respectively, when their Q outputs are in the high state. Hence, resetting flip-flops 66 and 68 prevents the engine from starting until one of the Q outputs is forced high. Further, since each output is connected to the other's input, any clocking provided by SPOUT will not effect the output until one of the flip-flops 66 or 68 is set. Flip-flop 66 or 68 can be set by a CID transition, or a by pulse which replaces the CID transition, both of which are detected by block 32. Hence, an effective CID signal must be generated to actuate one of the coil drivers, and a correct CID signal must be generated to start the ignition in the correct sequence.

Block 32 of FIG. 3 includes two monostable latches 44 and 46, commonly referred to as "one-shots". Latches 44 and 46 are used to momentarily generate (pulse) an output signal whenever CID changes from a low-to-high or from a high-to-low state. The inputs of latches 44 and 46 are connected to the outputs of NAND gates 48 and 50, respectively. Latch 44 or 46 is actuated whenever its input changes from the low-to-high state. The common input to gates 48 and 50, connected to the output of gate 38, operates to effectively enable the outputs of gates 48 and 50 when the common input is in the high state. When the common input is in the low state, the outputs of gates 48 and 50 will be forced high.

CID controls the remaining respective inputs to gates 48 and 50. CID is input to buffer 52 which includes hysteresis for noise immunity. The output of buffer 52 is connected to the remaining input of gate 48 and to the input of inverter 54. When CID changes from the high-to-low state, as long as the output of gate 38 is high, latch 44 will be actuated. Gate 54 inverts CID such that when CID changes from the low-to-high state, as long as the output of gate 38 is high, latch 46 will be actuated. Hence, when CID changes in either direction, the change will be detected.

Latches 44 and 46 may also be actuated by the output of block 30. After power-up, flip-flops 36 and 38 are reset by the output of OR gate 62. The input to flip-flop 36 is set in the high state, and block 30 begins to sense transitions in SPOUT. SPOUT is used to clock flip-flops 36 and 38 such that the output of block 34 (which is high after power-up) is "shifted" through each flip-flop with each low-to-high transition of SPOUT. However, once a CID transition is detected, flip-flops 36 and 38 are reset and the sensing is effectively terminated. If a CID transition is not detected after two low-to-high transitions in SPOUT, the common input to NAND gates 48 and 50 changes from the high state to the low state, and one of the latches (depending on the current state of CID) in block 32 is actuated. Hence, after power-up, a logic "1" will be shifted through block 30 to trigger a psuedo CID pulse, in attempt to start the engine, unless a prior CID pulse is detected.

In block 34, the S-R flip-flop includes NAND gates 40 and 42 which are arranged in the conventional manner. The external input to gate 42 is connected to power-up circuitry (not shown). When the ignition is provided power, the power-up circuitry pulses low. This low pulse resets flip-flop 34 so that the output of gate 42 is set in the high state, and the output of gate 40 is set in the low state. Also, the power-up pulse is inverted through inverter 60 to reset flip-flops 66 and 68, and is connected through OR gate 62 to reset flop-flops 36 and 38. The external input to gate 40 is connected to the output of inverter 58, and pulses low whenever a CID pulse is detected (output from latch 44 or 46). When a CID pulse is detected, the output of flip-flop 34 is reset to prevent a psuedo CID pulse from being initiated by block 30. Accordingly, the power-up pulse effectively enables block 30 to begin counting transitions in SPOUT until the output of flip-flop 34 changes to the low state, indicating that a transition in CID has been detected.

The functions of each block in FIG. 3 are now summarized.

Block 28 is used to sequentially actuate coil drivers 20 and 22. SPOUT is used to clock the counter in block 28 to indicate when the coil drivers should be actuated. However, the counter must be initialized so that it begins to fire the spark plugs in the correct sequence. Block 32 is used for this initialization.

This initialization is accomplished by Block 32 by detecting transitions in the CID signal. When a transition (or psuedo transition) in CID is detected, block 32 initializes the counter in block 28 and informs blocks 30 and 34 that this initialization has occurred.

Block 30 is used to generate a psuedo CID signal if the original CID has failed. At power-up, the output of block 34 is set to enable block 30 to begin sensing transitions in SPOUT. In the present embodiment, SPOUT is sensed for one cycle, which establishes a time window during which a transition in CID should occur. If block 32 detects a transition in CID while SPOUT transitions are being counted (indicating that CID is working properly), then the flip-flops in block 30 are reset and block 30 is disabled until the circuit experiences another power-up. If block 32 does not detect a level transition in CID while SPOUT transitions are being counted (indicating that CID is not working properly), then one of the latches in block 32 is set in attempt to start the engine.

When either latch 44 or 46 is actuated, flip-flops 36 and 38 are reset, as discussed above, and either flip-flop 66 or 68 is set. When either latch 44 or 46 is actuated, the respectively connected flip-flop 66 or 68 is set to establish a firing sequence for the spark plugs. Once either flip-flop 66 or 68 is set, the corresponding coil driver will attempt to start the engine. If the flip-flop is set correctly, each low-to-high transition in SPOUT will continue to select and actuate subsequent firings in the correct sequence.

The present invention therefore provides a technique to fire the spark plugs in a distributorless ignition system when the signal which is used to select the correct sequence of plugs has failed to function properly. Theoretically, on a four cylinder engine, the first attempt to fire the plugs has a 50% chance of success (33% for a six cylinder engine, and 25% for an eight cylinder engine). However, on randomly selected engines it has been discovered that, because of the position of the crankshaft before starting the engine, the average success rate is actually over 80%.

While the invention has been particularly shown and described with reference to a preferred embodiment, it will be understood by those skilled in the art that various other modifications and changes may be made to the present invention described above without departing from the spirit and scope thereof.

What is claimed is:

1. In an ignition system employing a crankshaft and spark plugs, wherein at least one identifier signal is generated which is indicative of a crankshaft angle position and which may be used to identify a spark plug firing sequence, a method for selecting ones of the spark plugs to fire, comprising the steps of:
    (a) determining whether or not a transition in the identifier signal has occurred;
    (b) generating, in response to the absence of the identifier signal, a replacement signal independent of the crankshaft angle position; and
    (c) selecting at least one of the spark plugs to fire from said generating replacement signal.

2. The method of claim 1, wherein step (a) further includes the step of determining a time window during which a transition in the identifier signal should occur.

3. The method of claim 1, wherein step (a) further includes the step of determining that power has recently been provided to the system.

4. The method of claim 1, wherein step (c) further includes the step of providing a counter to select which spark plugs to fire.

5. The method of claim 4, wherein step (c) further includes the step of initializing said counter to begin firing the spark plugs in the appropriate sequence.

6. In an ignition system, wherein at least one reference signal is generated which may be used to periodically indiate when spark plugs should be fired along with at least one identifier signal which may be used to identify a spark plug firing sequence, a method for selecting ones of the spark plugs to fire, comprising the steps of:
    detecting ignition system start up;
    in response to the detection of ignition system start up, determining a time window during which a transition in the identifier signal should occur;
    determining whether or not a transition in the identifier signal has occurred during the window; and
    generating a replacement signal, in response to the absence of the identifier signal during the window, to select at least one of the spark plugs to fire.

7. The method of claim 6, wherein the window is intialized in response to the detection of ignition system startup.

8. The method of claim 6, wherein the window is initialized at a transition in the reference signal.

9. The method of claim 6, wherein the length of the window is equal to one cycle of the reference signal.

10. The method of claim 6, wherein the window is terminated at a transition in the reference signal.

11. The method of claim 6, further including the step of providing a counter to sequentially select which spark plugs to fire.

12. The method of claim 11, wherein generating said replacement signal includes the step of initializing said counter to begin firing the spark plugs in the appropriate sequence.

13. In an ignition system, wherein at least one reference signal is generated which may be used to periodically indicate when spark plugs should be fired along with at least one identifier signal which may be used to identify a spark plug firing sequence, a method for selecting ones of the spark plugs to fire, comprising the steps of:
    sensing the reference signal and the identifier signal after power has been provided to the system to determine a time window during which a transition in identifier signal should occur;
    determining whether or not a third signal should be generated in place of the identifier signal, including the step of
    disabling said step of sensing in response to the presence of a transition in the identifier signal during the window; and
    generating said third signal, only if the step of sensing has not been disabled during the window, to select particular ones of the spark plugs to fire.

14. The method of claim 13, wherein the window is initialized when power is provided to the ignition system.

15. The method of claim 13, wherein the window is defined between two transitions in the reference signal.

16. The method of claim 13, wherein the length of the window is equal to one cycle of the reference signal.

17. The method of claim 13, further including the step of initializing and terminating the window at respective transitions in the reference signal.

18. In an ignition system, wherein at least one reference signal is generated which may be used to periodically indicate when spark plugs should be fired along with at least one identifier signal which may be used to identify spark plug firing sequence, an apparatus for selecting ones of the spark plugs to fire, comprising:
    means for detecting ignition system start up;
    means, responsive to said means for detecting, for determining a time window during which a transition in the identifier signal should occur;
    means for determining whether or not a transition in the identifier signal has occurred during the window; and
    generating means for generating a replacement signal, in response to the absence of the identifier signal during the window, to select at least one of the spark plugs to fire.

19. The apparatus of claim 18, wherein the window is initialized in response to the detection of ignition system start up.

20. The apparatus of claim 18, wherein the window is initialized at a transition in the reference signal.

21. The apparatus of claim 18, wherein the length of the window is equal to one cycle of the reference signal.

22. The apparatus of claim 18, wherein the window is terminated at a transition in the reference signal.

23. The apparatus of claim 18, further including a counter coupled to said generating means to sequentially select which spark plugs to fire.

24. The apparatus of claim 23, wherein means for generating the replacement signal includes means for initializing said counter to begin firing the spark plugs in the appropriate sequence.

25. In an ignition system employing a crankshaft and spark plugs, wherein at least one identifier signal is generated which is indicative of a crankshaft angle position and which may be used to identify a spark plug firing sequence, an apparatus for selecting ones of the park plugs to fire, comprising:
   means for determining whether or not a transition in the identifier signal has occurred;
   means for generating, in response to the absence of the identifier signal, a replacement signal independent of the crankshaft angle position; and
   selection means for selecting at least one of the spark plugs to fire from said generated replacement signal.

26. The apparatus of claim 25, further including means for determining a time window during which a transition in the identifier signal should occur.

27. The apparatus of claim 25, further including means for determining that power has recently been provided to the system.

28. The apparatus of claim 25, further including a counter coupled to said selection means to sequentially select which spark plugs to fire.

29. The apparatus of claim 27, wherein means for selecting at least one of said spark plugs includes means for initializing said counter to begin firing the spark plugs in the appropriate sequence.

30. In an ignition system employing a crankshaft and spark plugs, wherein at least one identifier signal is generated which is indicative of a crankshaft angle position which may be used to identify a spark plug firing sequence, a method for selecting one of the spark plugs to fire, comprising the steps of:
   (a) detecting ignition system start-up;
   (b) determining whether or not a transition in the identifier signal has occurred;
   (c) generating, in response to the absence of the identifier signal and the detection of ignition system start-up, a replacement signal; and
   (d) selecting at least one of the spark plugs to fire from said generated replacement signal.

31. In an ignition system employing a crankshaft and spark plugs, wherein at least one identifier signal is generated which is indicative of a crankshaft angle position which may be used to identify a spark plug firing sequence, an apparatus for selecting one of the spark plugs to fire, comprising:
   (a) means for detecting ignition system start-up;
   (b) means for determining whether or not a transition in the identifier signal has occurred;
   (c) means for generating, in response to the absence of the identifier signal and the detection of ignition system start-up, a replacement signal; and
   (d) means for selecting at least one of the spark plugs to fire from said generated replacement signal.

* * * * *